G. G. F. BOSWELL.
SHOCK ABSORBER.
APPLICATION FILED NOV. 21, 1919.
1,352,651.
Patented Sept. 14, 1920.
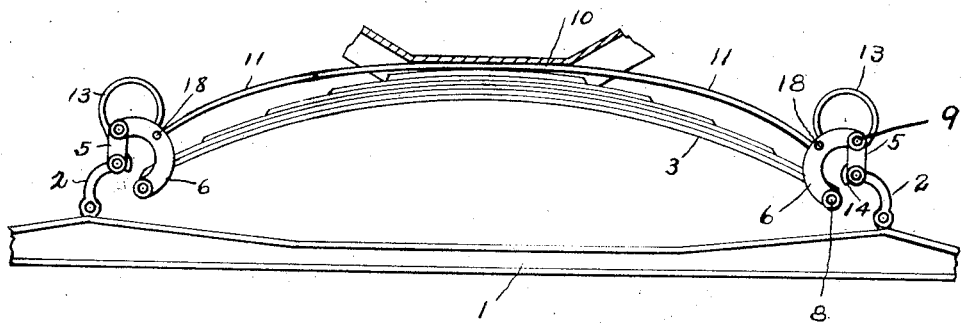
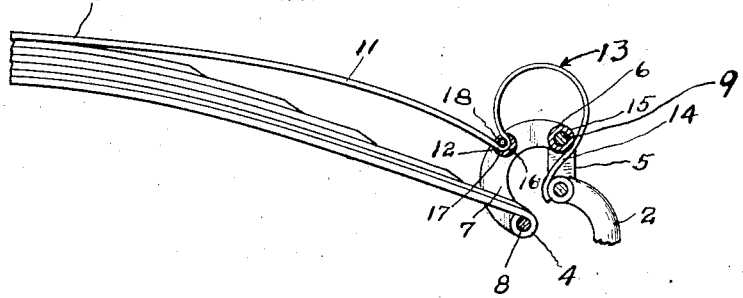
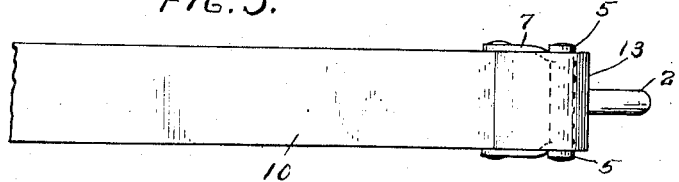
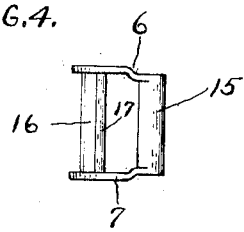
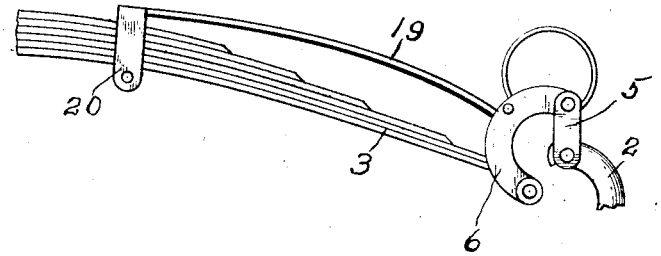
INVENTOR.
GEORGE G. F. BOSWELL
BY Carey S. Frye
ATTORNEY.

UNITED STATES PATENT OFFICE.

GEORGE G. F. BOSWELL, OF INDIANAPOLIS, INDIANA.

SHOCK-ABSORBER.

1,352,651.      Specification of Letters Patent.      Patented Sept. 14, 1920.

Application filed November 21, 1919. Serial No. 339,535.

*To all whom it may concern:*

Be it known that I, GEORGE G. F. BOSWELL, a citizen of the United States, residing at Indianapolis, in the county of Marion, State of Indiana, have invented certain new and useful Improvements in Shock - Absorbers, of which the following is a specification.

This invention relates to shock absorbers and is primarily an improvement on my former patent, issued October 9, 1917, No. 1,242,316 and the prime feature of this invention, in addition to providing a spring structure for taking up and absorbing all shocks incident to impacts and rebounds, is in so constructing the spring structure that it will normally maintain the shackle and shackle plates in an upright position, the shackle plates being normally held in a vertical position so that the upper pivot end thereof will be vertically above the pivot end of the perch hanger.

A further feature of the invention is the provision of a shock absorbing spring so constructed that it will resist and cushion any downward movement of the body spring and parts carried thereby and likewise resist any endwise movement of the body spring, thus practically eliminating swaying movement of the car body.

A further feature of the invention is the provision of means for suspending the body spring so that it will have the same relative movement around the pivot end of the perch hanger and be suspended practically the same distance therefrom.

A further feature of the invention is in so constructing the parts for suspending the body spring from the perch hanger that said parts will have different pivotal points separately brought into action during different movements of the body spring.

Other objects and advantages will be hereinafter more fully set forth and pointed out in the accompanying specification.

In the accompanying drawings which are made a part of this application,

Figure 1 is a front elevation of an automobile axle of the Ford type showing the manner of applying the shock absorber springs to the body spring and perch hanger.

Fig. 2 is a sectional view of the hanger construction at one end of a body spring.

Fig. 3 is a top plan view thereof.

Fig. 4 is a top plan view of one of the shackles removed from the body spring.

Fig. 5 is an elevation of one end of a body spring showing a different form of shock absorber spring.

Referring to the drawings, 1 indicates an automobile axle of the Ford type and 2 indicates the perch hanger associated therewith, these parts being of the usual formation. Coöperating with the hangers 2 is a body spring 3 also of the usual type, the ends thereof having bolt receiving eyes 4, as is usual, said spring being preferably built up of a plurality of leaves.

In the ordinary construction of cars of this class, the body springs are suspended from the perch hangers by shackle plates which extend downwardly from the pivot end of the perch and are pivoted direct to the end of the spring, but in this construction, the shackle plates 5 are swung upwardly to a vertical position with the pivot end thereof above the pivot end of the perch hanger and a shackle 6 is pivoted at one end to the upper ends of said plates 5, said shackle having arms 7 which pass along opposite edges of the body spring and the free ends thereof are secured to the body spring by passing a pivot bolt 8 through said arms and the eye 4 at the end of the body spring.

The shackle 6 is so curved and is of such a length that the end of the body spring 3 will be suspended substantially the same distance below the pivot end of the hanger 2 and will have the same relative arcuate swinging movement therewith, as when the shackle plates are extended directly from the perch hanger to the end of the body spring.

In suspending the body spring in this manner, an end thrust of the body spring will cause the shackle 6 to pivot on the bolt 9, employed for securing the shackle to the upper ends of the shackle plates 5, thus causing the end of the body spring to swing in an arc of a circle around the pivot end of the perch hanger 2, but when a vertical movement is imparted to the body spring, the pivot action will result at both the pivot point between the shackle and shackle plates and between the shackle plates and the perch hanger, the principal pivot action, in this instance, resulting at the pivot connection between the plates 5 and hanger.

In order to cushion the movement of the body spring, either vertically or end-wise, and at the same time maintain the shackle plates 5 normally in a vertical position, a shock absorbing spring 10 is provided, the body portion 11 of the shock absorbing spring having a looped portion 12, that portion of the spring 10 beyond the looped portion terminating in a bowed member 13, the free end 14 of the bowed member passing between the cross head 15 of the shackle and the pivot end of the perch hanger 2, the extreme end of the portion 14 being curved to conform to the curvature of the end of the perch hanger, the end portion 14 passing between the shackle plates 5.

The looped portion 12 enters a seat 16 formed in a cross bar 17, the ends of the cross bar being attached to the arms 7, the looped portion being secured in the seat by means of a pin 18. By anchoring both ends of the bowed member 13, as shown, the tension thereof will serve to normally hold the shackle plates in a vertical position, while any pivotal or swinging movement of the shackle or shackle plates will be resisted by the spring tension of the bowed member.

In Figs. 1 to 3, the spring 10 replaces one of the leaves of the body spring 3, consequently the body portion 11, of this form extends the full length of the body spring and this body portion is secured to the body spring 3 in the usual or any preferred manner and consequently forms a part of the body spring and, while the shock absorber spring is shown as displacing the top leaf of the body spring, it will be understood that any one of the body spring leaves may be removed and the shock absorbing spring substituted therefor.

In this form of device the body portion of the shock absorbing spring, between its central portion or point of engagement with the body spring and the loop portion thereof, is positioned a distance above the body spring and any movement of the body spring in any direction will first be directed against the shock absorber spring, the resistance thus encountered practically absorbing any shock before it is transmitted to the body spring.

It will likewise be seen that any end movement of the body spring will be directed against the bowed portion 13, the tension of the bowed member being such as to practically prevent undue endwise movement of the body spring, consequently the car body will be held against side sway.

In Fig. 5 of the drawings a slightly modified form of shock absorber spring is shown in that the body member 19 is formed in two sections, the inner ends being secured to the body spring 3 in any suitable manner, as by means of a clip 20. The remainder of this structure is the same as the form shown in the former views and the action of the various parts is substantially the same in both instances.

The invention claimed is:

1. The combination with a semi-elliptical spring of a vehicle, of a shock absorber construction including pivoted shackle plates, a spring supporting shackle pivoted at one end to the upper ends of said plates and at its lower end to the vehicle spring, a shock absorbing spring secured to the vehicle spring and having a bowed portion coöperating with said plates and shackle for resisting movement of the vehicle spring.

2. The combination with a vehicle body spring, and a perch hanger, of a shock absorber construction including shackle plates pivoted at one end to said perch hanger and extending vertically thereabove, a spring supporting shackle pivoted at one end to the upper ends of the shackle plates and at a point vertically over the pivot end of the perch hanger, the opposite end thereof being pivoted to the body spring, and a shock absorbing spring connected to the body spring, said shock absorbing spring having a looped portion for connection with said shackle and a bowed portion for normally holding said shackle plates in vertical position and for resisting movement of the body spring.

3. The combination with a vehicle body spring and a perch hanger, of shackle plates pivoted at one end to said perch hanger, a shackle pivoted at one end to the opposite ends of said plates and at its opposite end to said body spring, a shock absorbing spring connected with said body spring, said shock absorbing spring having a looped portion in its length, means for securing the looped portion to the shackle, and a bowed portion extending from said looped portion over the pivot point between said plates and shackle, the free end of the bowed portion passing between said plates and connecting with the pivot end of the hanger.

4. The combination with a vehicle body spring, of a pair of vertically extending shackle plates, a shackle pivoted to the upper ends of said plates, said shackle having depending arms, a cross bar connecting said arms, said bar having a seat therein, a shock absorber spring connected with said body spring and having a looped portion entering the seat in said cross bar, means for securing said looped portion in said seat, and a bowed member beyond said looped portion having its free end passed between said plates, adapted to support said plates in a vertical position and cushion and resist movement of said body spring.

5. The combination with a vehicle spring, a shackle for supporting said spring, and shackle plates to which the shackle is pivoted, of a shock absorber spring secured to and forming a part of said vehicle spring, and means for connecting parts of said shock absorber spring to said shackle and plates for normally holding said plates in a vertical plane and resist movement of the vehicle spring.

6. The combination with a vehicle spring formed of leaves, shackles for supporting said spring, and shackle plates to which said shackles are pivoted, of a shock absorber spring forming one of the leaves of said vehicle spring, and bowed members at the ends of the shock absorber springs coöperating with said shackles and shackle plates for resisting movement of said vehicle spring.

7. The combination with a vehicle spring, and a perch hanger, of shackle plates pivoted at one end to said perch hanger and extending vertically above the pivot end of the perch hanger, a shackle comprising a cross head, arms depending from the cross head, means for pivoting the cross head to the upper ends of said shackle plates, a cross bar between said arms having a seat therein, a shock absorber spring connected with said vehicle spring and having a looped portion adapted to enter said seat in the cross bar, and a bowed member beyond the looped portion the free end of which is passed between said shackle plates and between the cross head of the shackle and the pivot end of the perch hanger, the extreme end of the bowed member conforming to the curvature of the end of the perch hanger.

In testimony whereof I hereunto affix my signature.

GEORGE G. F. BOSWELL.